United States Patent
Noel et al.

[11] Patent Number: 5,971,443
[45] Date of Patent: Oct. 26, 1999

[54] THREADED JOINT FOR PIPES

[75] Inventors: Thierry Noel, Sebourg; Bruno Cacciaguerra, St Clement de Riviere, both of France

[73] Assignee: Vallourec Mannesmann Oil & Gas France, Aulnoye-Aymeries, France

[21] Appl. No.: 09/049,016

[22] Filed: Mar. 27, 1998

[30] Foreign Application Priority Data

Mar. 27, 1997 [FR] France ................................. 97 04016

[51] Int. Cl.$^6$ .................................. F16L 7/00; F16L 9/00; F16B 39/00
[52] U.S. Cl. ........................... 285/94; 285/334; 285/915; 411/82; 411/258
[58] Field of Search ............................ 411/82, 258, 369, 411/930; 285/294.3, 296.1, 355, 915, 94, 334

[56] References Cited

U.S. PATENT DOCUMENTS

| | | | |
|---|---|---|---|
| 1,946,619 | 2/1934 | Furman et al. | 285/294.3 X |
| 4,161,332 | 7/1979 | Blose . | |
| 4,682,797 | 7/1987 | Hildner | 285/915 X |
| 4,804,209 | 2/1989 | Fischer | 285/915 X |
| 4,955,645 | 9/1990 | Weems | 285/355 |
| 4,988,127 | 1/1991 | Cartensen | 285/355 X |
| 5,066,052 | 11/1991 | Read | 285/355 X |
| 5,253,902 | 10/1993 | Petelot et al. | 285/355 X |

Primary Examiner—Neill Wilson
Attorney, Agent, or Firm—Oblon, Spivak, McClelland, Maier & Neustadt, P.C.

[57] ABSTRACT

The invention pertains to a tubular threaded joint provided with a device opposed to over-screwing or unscrewing. The joint includes a male component (3) with an external threading (8) and a female component (2) with internal threading (6), these two components capable of being assembled with predetermined amount of torque. A female portion (7) arranged beyond the female threading (19) and a male portion (13) arranged beyond the male threading (12) provide between their internal surface (14) and external surface (15) an annular zone in which one part at least forms a calibrated zone (20) in which an adhesive ensures mechanical connection between the female portion (7) and the male portion (13). Use of the joint particularly for the oil and gas industry.

22 Claims, 8 Drawing Sheets

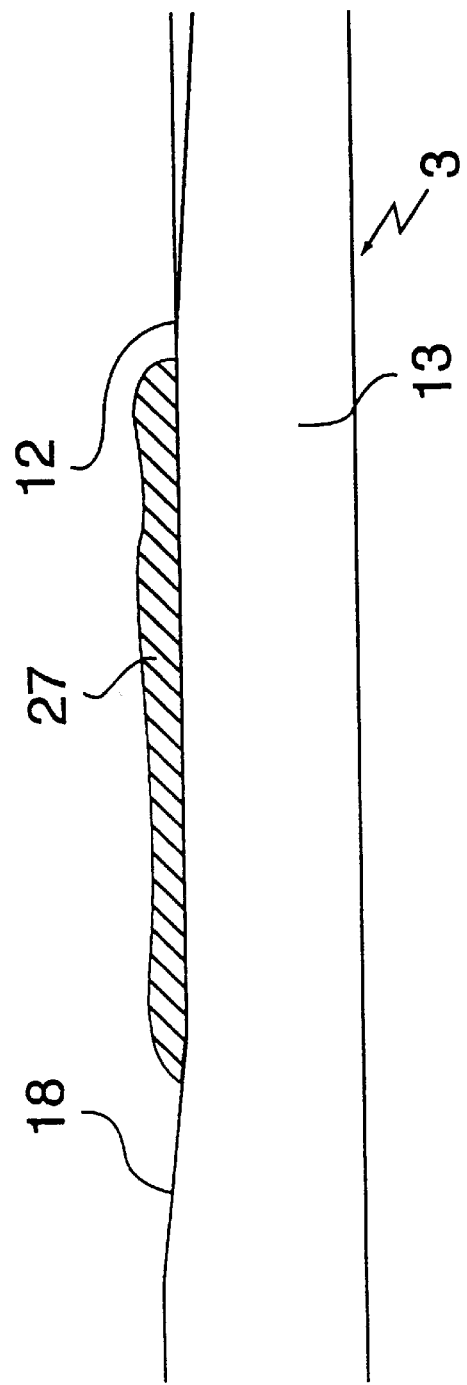
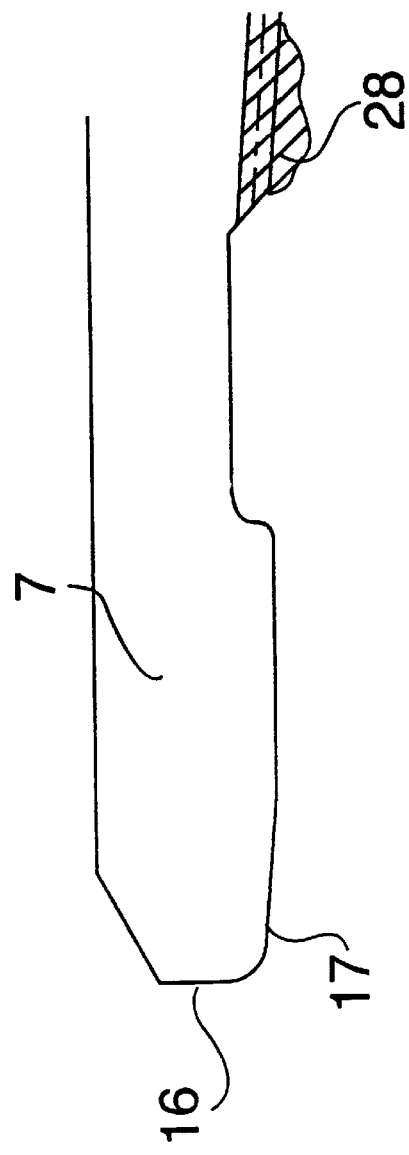

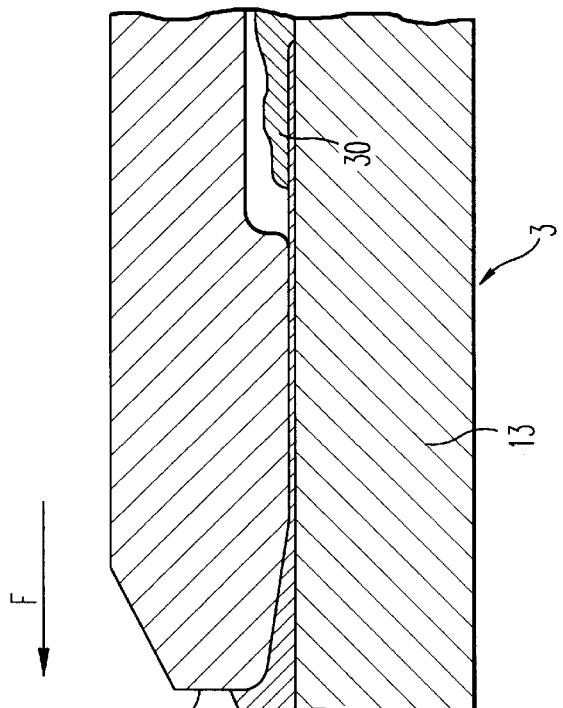
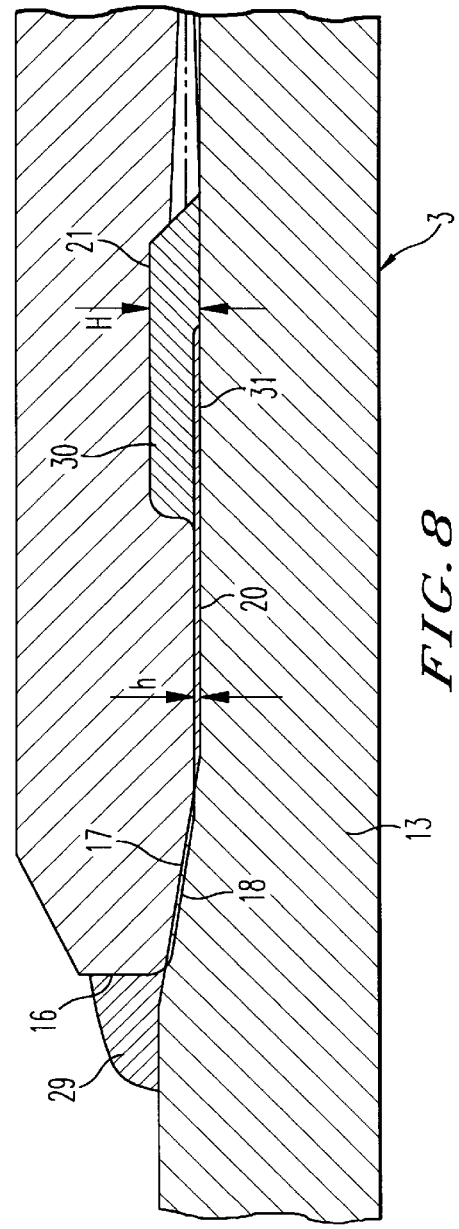
FIG. 7
FIG. 8

THREADED JOINT FOR PIPES

BACKGROUND OF THE INVENTION

1. Field of the Invention

This invention pertains to a new threaded joint for pipes which is provided with a device to oppose over-screwing or unscrewing in order to avoid undesirable and uncontrolled rotations of one of the tubular elements with respect to the other after the two tubular elements have been joined by the joint in accordance with the invention.

2. Discussion of the Background Art

The majority of presently available joints are not provided with devices that oppose over-screwing or unscrewing, and it suffices to apply a torque greater than the torque which was used for the assembly of two tubular elements in order to cause rotation of one element with respect to the other, this rotation being effected in the direction of complementary screwing, or in the direction of unscrewing.

However, in certain circumstances it is necessary to prevent any relative rotation of one tubular element with respect to another after tightening of the joint to the desired torque, such unscrewing or over-screwing capable of being caused in operation due to the forces and displacements to which the pipes are subjected, forces and displacements which can create torques greater than the coupling torques. Such unscrewing or over-screwing may also be produced in particular because of vibrations with the applied torques which can in this case be less than the torques used in the initial connection.

Generally, one will resort in this case to welded joints, which of course have the disadvantage of requiring a considerably heavy material. These joints cannot be taken apart and are used only with easily welded materials.

SUMMARY OF THE INVENTION

In accordance with the invention, the joints are particularly, but not exclusively, intended for the petroleum and gas industry in which steel pipes are joined to one another by these said joints in order to constitute main pipe lines of more or less great lengths and of varied shapes which can transport various fluids or mixtures of fluids.

According to the invention, the joints are especially adapted in the petroleum and gas industry to making various main pipe lines that are used for off-shore exploitation, for example, in order to link the floating platforms or barges to the ocean bottoms or to connect one point on the ocean bottom to another.

It is crucial to obtain reliable and safe exploitation conditions of the off-shore petroleum or gas fields so that the joints once they are screwed together at controlled torque cannot be over-screwed or unscrewed during operation in an uncontrolled manner.

In the known and traditional way, these main pipelines are currently comprised of steel pipes of standard length of approximately 12 meters, for example, and are joined end to end by welded joints. They are subject to various movements due to vibrations, ocean currents, waves, and relative movements of the platform-barge with respect to the pipes, movements which can create forces, and torques which have a tendency to turn the pipe sections with respect to one another.

These phenomena of relative movements of the pipe sections with respect to one another can occur during the installation of the pipes or after installation in the operational phase.

According to the invention, the joints are intended for replacement of the welded joints.

According to the invention, the joints can of course be used for any other application in the petroleum or gas industry or in any other industry, the geothermal industry, for example, and are particularly attractive for any application in which one desires to avoid rotation of one tubular element with respect to another following assembly by joints.

In accordance with the invention, the joint can be used for casing pipes or tubing pipes for oil or gas wells.

Threaded joints that connect pipes which are provided with devices that oppose unscrewing or over-screwing following assembly of the pipes are already known. Such a joint is described in U.S. Pat. No. 2,318,590 for drilling rods that are assembled by joint tools and consists of inserting, between the external peripheral surface of the pipe and the internal surface of each free end of the joint sleeve, in an annular space open to the outside and provided for this effect, an annular piece that includes indentations toward the outside and toward the inside which fit in corresponding indentations of the pipe and the sleeve, an annular piece which therefore is then fitted together by force.

Such an annular piece which serves as a means for blocking over-screwing or unscrewing can be arranged directly between the pipe and sleeve or through the intermediary of a third intermediate piece which extends the sleeve. U.S. Pat. No. 2,318,590 describes different more or less complex variants which all consist in arranging on the outside of the joint or in a space open to the outside of the joint a set of complementary parts that mechanically link the pipe and sleeve.

One will find the same basic concept in U.S. Pat. No. 2,797,109 which utilizes, as the means of blocking, a large number of toothed parts inserted in an annular space arranged at the end of the joint and open to the outside between the outside surface of a pipe and the internal surface of another pipe, the sharp edges of the toothed parts being opposed to the unscrewing and exclusively to the unscrewing of the pipes.

U.S. Pat. No. 2,845,106 makes use of the same principle, but in this case, the annular space, which is open to the outside of the joint, has an eccentric shape and the blocking part inserted in the space and which occupies approximately 50% of the periphery is also eccentric.

In the case of U.S. Pat. No. 2,845,106, and very likely U.S. Pat. No. 2,797,109, one should note that the blocking means does not prevent small displacements in rotation of one pipe with respect to the other, the blocking occurring only after this displacement has occurred. There is no blocking in the initial position of screwing but in an adjacent position.

All devices described in patents U.S. Pat. No. 2,318,590, U.S. Pat. No. 2,797,109, and U.S. Pat. No. 2,845,106 require the utilization for each joint of one or several complementary parts which are inserted in an annular housing between the pipe and joint, the housing has a shape more or less complex in which the machining represents an additional cost during fabrication of the joint. This requires one to separately manage the storage of complementary parts based on the dimensions of the pipes.

In addition, the housing and this complementary part are located outside the joint and are not protected from the external environment especially vis-à-vis problems of corrosion. One must also ensure during handling of the joints and based on their positions that the complementary parts remain in position after they have been positioned there.

The patent WO 96/29533 describes another type of joint which will prevent rotation of one pipe with respect to another during installation.

In this document the two pipes are linked mechanically to one another by the interlocking of wide teeth cut at their respective ends, the final installation being achieved by causing one sleeve to turn up to a predetermined reference point in which the two ends of the pipes have been inserted in such a way that this sleeve will cover the same length of the two ends of the pipes whose threads are of cylindrical shape. A sealing ring comprised of a removable part is arranged in the middle of the sleeve, and some tight bearing surfaces are provided at each end of the sleeve.

This solution is effected with cylindrical threading and cannot be applied to an integral-type joint, that is, one without a sleeve. In addition, once the latter is in position, no device for ensuring screwing of the sleeve is provided.

The present invention envisages creation of a new threaded joint for a pipe provided with a device that opposes over-screwing or uncontrolled unscrewing which can be used in particular in place of welded joints and which does not have the disadvantages of the previously described solutions.

Thus, the invention attempts to create a threaded joint which does not require implementation of complementary parts to ensure its screwing or to ensure its tightness during operation and which remains easy to install.

In addition, the invention attempts to create a threaded joint which can be achieved in a sleeve-type version or in an integral joint version and whose structure, basic operational qualities and characteristics of use are modified to the least extent with respect to a threaded joint that does not include a device that opposes over-screwing or unscrewing.

The invention also attempts to develop a threaded joint provided with a device opposed to over-screwing and unscrewing which can be adapted to different already existing threaded joints and to different types of threadings, whether one is concerned with so-called superior or premium joints which include in particular means of controlling the shoulder-stop-type assembly of screwing and tight bearing surfaces or standard joints of the API joint types.

The invention also attempts to create a threaded joint which, while providing a device opposed to over-screwing and unscrewing, can be taken apart without difficulty and without the said device deteriorating or leaving detrimental impressions on the internal or external surface of the pipes or sleeves.

The invention also attempts to create a threaded joint which requires only the simplest possible additional machining.

The invention also attempts to produce a threaded joint which is tight vis-á-vis the external medium and which if necessary can receive an external coating to protect it against corrosion, particularly in an ocean environment.

According to the invention, the threaded tubular joint includes a male tubular component provided with male external threading, a female tubular component provided with female internal threading which corresponds to the male external threading of the male component, and means for assembling these two components according to a predetermined amount of torque tightening. The male component is screwed inside the female component at a predetermined amount of torque.

The female component includes beyond the downstream end of its threading an unthreaded female portion which is provided at the end on its internal wall with a female bearing support surface.

The male component includes on this side of the upstream end of its threading an unthreaded male portion which corresponds to the female portion, this male portion being provided at the end on its outside wall with a male bearing surface which corresponds to the female bearing surface and which is in supporting contact on the female bearing surface when the male and female components of the joint are in screwed in position.

The terms downstream and upstream are used as explained subsequently: for a male or female component, downstream is oriented along the axis of the component toward the free end of the component while upstream is oriented toward the inside of the component.

The internal surface of the unthreaded female portion, the said unthreaded female portion being called subsequently for simplification "the female portion," extending from the downstream end of the female threading to the female bearing surface and the external surface of the unthreaded male portion, the said male unthreaded portion being called subsequently for simplification "the male portion," which extends from the upstream end of the male threading to the male bearing surface, are separated radially from one another and create between the female portion and the male portion an annular zone without contact.

This annular zone is such that on at least one part of its measured length parallel to the common axis of the components, there is a calibrated annular space in which an adhesive, which fills all or part of this annular space, ensures mechanical connection between the female and the male portion.

By calibrated annular space, we mean a volume defined by the internal surface of the female portion and the external surface of the male portion, these two surfaces being opposite one another. These two surfaces are separated at their different points by a radial distance of a few tenth of millimeters, the preferred radial distance being approximately constant over the length of the annular space. The external surface of the male portion and the internal surface of the female portion are preferably cylindrical or tapered, or more generally, in rotation.

Said radial distance will be selected essentially as a function of the diameter and the thickness of the male and female components and the characteristics of the adhesive which is used in such a way as to be able to utilize a quantity of adhesive that allows one to ensure mechanical connection of the two components.

By way of non-limiting values, we can mention a radial distance between 0.15 mm and 1.0 mm. In a general way, the radial distances should be such values that they allow one to ensure effectiveness of the gluing under good conditions.

The annular zone, and in particular the annular calibrated space, can be arranged only on the male or the female portion; that is to say, they can be accomplished on only one of the two joint components.

Preferably, they will be arranged overlapping the male and the female portion. That is, they will be arranged both on the male component and on the female component of the joint.

Advantageously, the annular zone will include an annular part arranged directly in extension of the threading, the section of which being several times greater than the section of the calibrated annular space, the annular part occupying a fraction of the axial length of the annular zone. This annular part is intended to serve as a receiving part for the grease or equivalent substance that is capable of being ejected from the male and female threadings during the screwing process, these threadings generally being lubricated by grease or an equivalent substance as well as being capable of gathering excess unused adhesive in the annular calibrated space. The adhesive and grease are quite possibly mixed in this annular part.

For purposes of simplification, we will designate subsequently this annular part by the term grease pocket although as we have already explained this receiving part is not only used for grease.

Therefore, in the annular zone, there will be arranged successively, preferably beginning at the end of the male and female threaded sections, a grease pocket, then up to the male and female bearing surfaces, a calibrated annular space.

In this way, this arrangement will allow one to prevent the grease under pressure being ejected during screwing from entering into the calibrated annular space and disturbing the gluing arrangement of the male and female portions. This will also allow one to decompress the grease under pressure which is capable of being ejected during screwing and to thereby prevent the creation of stress zones in this part of the joint.

This grease pocket, which has a radial height that can reach approximately 1 to several mm, will preferably be arranged in the major part of the female portion in such a way that it will not reduce the effectiveness of the joint, that is, the useful section of the male component in the area of the male portion.

Of course, one will ensure that the annular calibrated space is always given a sufficient length to ensure conditions of satisfactory gluing.

Very advantageously, the male portion as well as the female portion and in particular the female bearing surface arranged at the downstream end of the female portion will have a geometry so that the internal surface of the female portion and in particular the female bearing surface and the external surface of the male portion will not be in contact during the phase when the joint is screwed together, the female bearing surface coming into supporting contact on the male bearing surface at the end of screwing in of the joint.

The supporting contact of the male and female bearing surfaces is obtained by elastic deformation and thereby creates metal-to-metal tightness at the level of the male and female bearing surfaces.

The female bearing surface and the male bearing surface will then have a shape so that there will exist in the screwed-in state of the joint an interference between the respective radial dimensions of these bearing surfaces. This interference creates a ferruling binding effect.

Thus, during the screwing of the joint, the female portion, and in particular the female bearing surface, will never be in friction with the male portion, and there will exist during the screwing phase at any given point in particular at the level of the annular calibrated space a radial interval for free passage between the male portion and the female bearing surface. This will allow easy installation of the joint and will also prevent harmful friction action and deterioration of the bearing surfaces in particular.

Preferably, the male and female bearing surfaces will have the shape of a truncated cone in which the peak is arranged toward the downstream end of the male component.

Advantageously, the half-angle at the top will be between 3 and 10° of the length of the bearing surfaces along the axis of the joint, advantageously around 3 to 10 mm.

Of course, the adhesive that is used will be an adhesive that has characteristics that make it suitable for use during screwing of the joint and for its use under operating conditions of the joint.

Among possible adhesives, one will select from adhesives for metals and an adhesive that is resistant to shock, maintaining during operation a capacity for elastic deformation and resistance to shearing and whose properties are at the least modified in the presence of grease, an adhesive which could also have a certain lubricating effect.

Preferably, the adhesive that is used will be an adhesive with setting quality controlled by an operation of heating, for example, and preferably also one that is quick setting. This will allow one to ensure installation of the joint in a controlled way in short periods of time and thus will offer good productivity at the pipe installation site or in a shop.

One could use an adhesive of the single-ingredient type in which hardening is controlled by a heating operation for example. It is also possible to use a double-component adhesive for which the mixture, for example an epoxy resin and hardener prepared immediately prior to use, hardening is controlled by a heating operation.

By way of example, an epoxy resin-based adhesive with hardening by means of the thermal effect could easily be implemented. The adhesive is advantageously positioned in the annular calibrated space which is reserved for it before screwing of the male component into the female component.

For this purpose, one will coat with adhesive, with brush or by any known means for example, the part of the male component corresponding to the calibrated annular space and one will screw the female component onto the male component up to its final position. The downstream end of the female portion will scrape away the excess adhesive from the female surface. The excess is ejected to the outside upstream of the male portion. The female surface does not rest on the male portion during screwing but only at the end of the screwing operation. The support occurs at the level of the male surface. In this way, one will obtain a calibrated annular layer of adhesive in the calibrated annular space. The adhesive will ensure, by its gluing properties, blocking at a predetermined torque of the internal wall of the calibrated annular space with respect to the external wall of the said space; therefore, it will block the male component with respect to the female component.

In another method, the adhesive can be inserted when the male component has been completely screwed into its assembly position in the female component.

In this case, one will provide on the female portion, at the level of the calibrated annular space, at least one injection channel and advantageously a vent channel. The injection channel allows the introduction, for example, by injection under pressure or by any other means known in the art of the necessary quantity of adhesive into the calibrated annular space. The injection channel or channels and the vent channel, if it exists, is closed preferably after usage by a device that can ensure tightness as, for example, a threaded stopper with or without tight seat or any means that can achieve the desired effect.

According to the invention, the threaded joint can be of the integral type or of the sleeve coupling type.

In the case of an integral-type joint, each of the pipes to be assembled will include at one of its ends, which end can possibly be reduced in diameter and/or of a reinforced wall thickness, a male component as described earlier and at its other end, which end can possibly be expanded in diameter and/or of a reinforced wall thickness, a female component as described earlier. In accordance with the invention, the joint is made by screwing a male component and a female component coming from two pipes to be assembled, the gluing process being carried out as explained earlier.

In the case of a sleeve coupling-type joint, the pipes to be assembled will include at both their ends the same type of component, in general a male component, two components coming from two pipes to be placed end to end to be screwed into the two corresponding components, in general female components, arranged at two ends of a connecting sleeve, the male and female components being made as has already been described.

The means which allow one to assemble the male component in the female component at a predetermined amount of tightening torque can be the means comprised of the threadings themselves or means that are independent of the threadings or even a combination of the means comprised of the threadings and means not connected to the threadings.

Thus, in the case of standard cylindrical threadings, for example API profile, therefore not the ferruling binding type, these means will be independent of threadings. It could be a question of known means such as assembly stop pieces or ferruling binding surfaces, as for example the bearing surfaces of the female and male portions if said bearing surfaces achieve an amount of torque sufficiently resistant to screwing, ensuring a metal-to-metal contact with sufficient resistant torque between the male component and female component in a zone other than the threadings.

In the case of tapered threadings, therefore ferruling binding-type, these means are comprised directly of the threadings and in particular of the interference between a male component and female component at the level of their threadings.

But these means can be complemented in the case of tapered threadings by means that are independent of threading such as shoulder stops and/or ferruling binding surfaces that ensure a metal-to-metal contact between the male component and the female component. These shoulder stops and/or metal-to-metal surfaces are able to carry out other functions rather than just tightening with predetermined amount of torque.

The threadings that can be used for the joint of the invention can be of any type as, for example, cylindrical, tapered, with one or several stages, or with negative angle.

Advantageously, in particular when the joint of the invention is intended for petroleum and gas industry applications and particularly for making off-shore main supply lines, one will provide the male component and the female component of the joint with metal-to-metal surfaces, thereby ensuring complementary watertightness of the joint particularly with respect to the fluid circulating inside. These joints could also advantageously include screw shoulder stops.

Thus, the joint according to the invention could be made in particular by using threaded joints which have already been described in the patents or European patent applications EP 0,488,912, EP 0,741,261, and EP 0,707,133.

BRIEF DESCRIPTION OF THE DRAWINGS

Without in any way limiting its scope, the invention will now be described by reference to examples of implementation and the corresponding figures.

FIG. 5 is a sectional view of the preparation before screwing of the zone of the male component upstream of its threaded section, along the axis of the joint, with only the part located above the axis shown in a very enlarged way with respect to FIG. 3, the.

FIG. 6 is a sectional view of the zone of the female component located downstream from its threaded section before being screwed in, along the axis of the joint, with only the part located above the axis shown in a very enlarged way with respect to FIG. 2.

FIG. 7 is a sectional view of the male and female components during screwing UPS from the male threaded section, along the axis of the joint, with only the part located above the axis shown in a very enlarged way.

FIG. 8 is a sectional view In sectional view of the male and female components at the end of screwing upstream from the male threaded section, along the axis of the joint, with only the part located above the axis shown in a very enlarged way.

DESCRIPTION OF THE PREFERRED EMBODIMENTS

Figure 1:
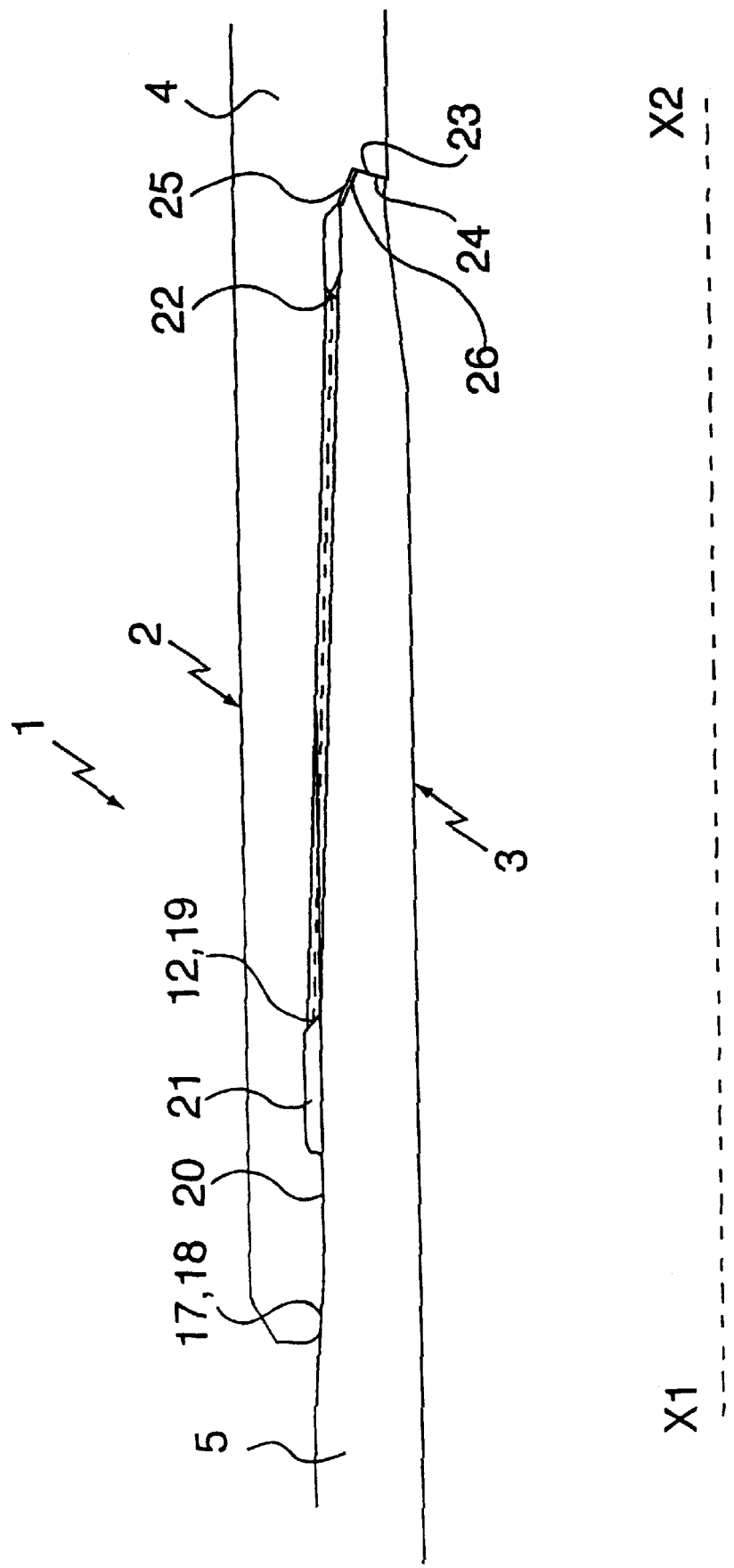
FIG. 1 is a sectional view of a joint in accordance with the invention in the installed state, viewed along its axis and greatly enlarged, with only the part located above the axis being shown.

In sectional view along its axis and greatly enlarged, FIG. 1 shows an assembled joint according to the invention.

Only the part located above the X1–X2 axis of the joint is shown here, the X1–X2 axis being for purposes of simplification presented in the plane of the figure while because of the scale of representation used here it will not necessarily be representable on the figure sheet.

One will see on this figure a joint 1 that includes a female component 2 and a male component 3 that are screwed into one another.

The female component 2 is arranged at the end of pipe 4, and the male component 3 is arranged at the end of pipe 5. Thus, the two pipes 4 and 5 are assembled by the joint in accordance with the invention.

Figure 2:
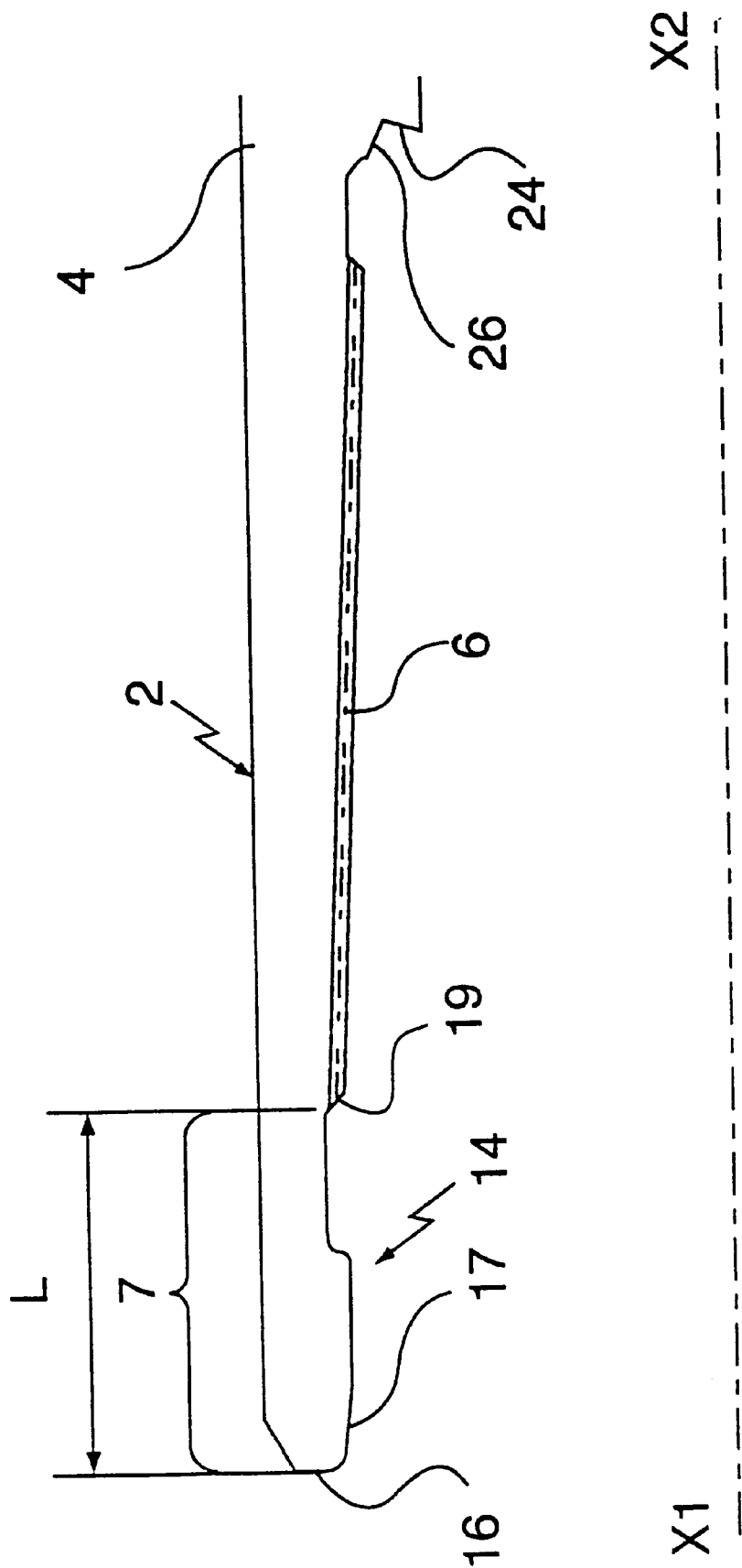
FIG. 2 is a sectional view of the female component, along the joint axis, in accordance with FIG. 1, with only the part located above the axis being shown here.

The female component 2 includes an internal female threading 6 (FIG. 2).

This threading 6 is tapered, its slope with respect to the X1–X2 axis being around 2.5% to 7.5%, and it is provided with traditional trapezoidal threads.

Downstream from threading 6, the female component 2 is extended by a female portion 7 which one can also see on FIG. 6.

The male component 3 (FIG. 3) includes external threading 8. This threading 8 is also tapered and corresponds to the female threading 6 of the female component 2.

In order to arrange a useful section 9 of the male component 3 which is as large as possible at point 12 which corresponds to the upstream end of threading 8, the male threads are vanishing from point 11, the point where the envelope of the thread crests of threading 8 and its common part rejoins the common surface of component 3.

Upstream from end 12 of the threaded section, the male component 3 is extended by a male portion 13 which one can also see in FIG. 8.

At 17, a female bearing surface is arranged on the downstream end 16 of the female portion 7 on the internal surface 14. There is arranged at 18 a male bearing surface on the external surface 15 of the male portion 13 at the downstream end of this portion and corresponding to the female bearing surface.

These two annular surfaces 17 and 18 and the geometry of the male 13 and female 7 portions are such that in the combined screwed-in state, the two annular surfaces 17 and 18 are in metal-to-metal support contact, thereby creating a certain tightness of the threaded joint vis-a-vis the fluid that is external to pipes 4 and 5.

The internal surface 14 of the female portion 7 between the bearing surface 17 and the downstream end 19 of the threaded section 6 and the external surface 15 of the male portion 13 between the bearing surface 18 and the upstream end 12 of the threaded section 8 create, when the male component 3 is screwed into assembled position in the female component 2, an annular zone that includes successively from the bearing surfaces 17 and 18:

an annular calibrated space 20 (FIG. 8);

an annular receptacle 21, which for simplification purposes is called the grease pocket; it is understood that this designation characterizes only one portion of its functions.

The internal 14 and external 15 surfaces are at points 20 and 21 radially distant from one another and do not have any point of support on one another.

The annular calibrated space 20 (see FIG. 8) is here comprised of two annular cylindrical surfaces which are made respectively on the internal surface 14 and the external surface 15 that are radially distant by a value "h" of some 1/10 millimeter. In the case of the present example and without this being in any way limiting, this space occupies approximately 50% of the length measured along the X1–X2 axis between the bearing surfaces 17 and 18 and the ends 12 and 19 of the threadings.

The grease pocket 21 is here also made by the radial interval existing between two cylindrical surfaces, surfaces that are distant from one another by a value "H." H is around 1 to several millimeters in size. By way of example, H can equal 6 to 30 times h.

In the assembled screwed in state, the female portion 7 then rests only on the male bearing surface 18 through the intermediary of its female bearing surface 17. The length "L" of the female portion 7 is around 15 to 40% of the axial length outside the female portion of the female component. This beam configuration with support point improves the bending behavior of the joint and fatigue resistance during bending of the joint, because of the decrease of contact pressures between the male component and female component at the threadings levels and bending constraints at the level of ends 12 and 19 of the threadings with respect to a joint that does not include a male portion 13 and female portion 7 with end 16 resting on the male component.

In a preferred manner and such is the case of the joints shown in FIGS. 1 to 9 one will impart to the male portion 13 and the female portion 7 a geometry and dimension so that during screwing in of joint 1 the internal surface 14 of the female portion 7, will not be in friction or will not be supported at any point and in particular not at the level of the female bearing surface 17 on the external surface 15 of the male portion 13. Thus one can facilitate installation of the joint and one can prevent deterioration, particularly of the surfaces of the annular calibrated space 20 and the female bearing surface 17.

It is only at the end of screwing when the male 3 and female 2 components approach their final position that the female bearing surface 17 will begin to rub against the male bearing surface 18. This male bearing is designed to then cause elastic deformation in the zone of downstream end 16 of the female component, the metal-to-metal contact 17–18 then being ferruling binding. For this reason, the radial distance separating the two surfaces of the calibrated space 20 is slightly increased at the end of screwing with respect to the radial distance existing during screwing. This radial distance then reaches the value h.

These bearings 17 and 18 are here truncated cones with their slope being about 5% with regard to the common axis X1–X2 of joint 1.

This installation is visible on a larger scale in FIG. 8 where we have deliberately shown at the level of bearing 17 and 18 the diametrical interference by representing the said bearings before their elastic deformation, the radial interval between the two bearings representing the interference.

Thus, one will see that at the end of screwing the radial width h of the annular space 20 is slightly increased when the two bearing surfaces 17 and 18 come into supporting contact.

In order to achieve such installation, it is necessary that the external diameter D1 of the male portion 13 be less than the common diameter D2 of pipe 5 on which the male component 3 is made.

We have made the grease pocket 21 on the female component 2 in order to reduce effectiveness of the joint as little as possible and therefore the thickness of the pipe at the level of the male component 3.

The joint 1 has tapered threadings 6 and 8. The latter, of course, are ferruling binding type with a predetermined radial interference. These threaded sections comprise one of the means that allow one to assemble the male component and the female component with a predetermined amount of torque.

In addition, in a known way, joint 1 is provided beyond end 22 of the threadings of the shoulder stops surfaces respectively 23 on the male component and 24 on the female component and with a second pair of bearing surfaces 25 on the male component and 26 on the female component respectively.

The shoulder stops surfaces 23–24 allow one to control the ferruling binding of the male threaded section 8 in the female threaded section 6 and to prevent excessively strong screwing while perfectly controlling the position of the male component with respect to the female component. Thus, the joint can be easily screwed in with controlled and predetermined amount of torque.

The second pair of bearing surfaces 25 and 26 ensure its tightness by means of metal-to-metal contact vis-á-vis the fluid circulating inside pipes 4 and 5.

On FIG. 1, we have shown the radial interference between the two male 25 and female 26 bearing surfaces by two lines that show these bearings before they have been applied to one another.

The shoulder stops 23 and 24 on the bearings 25 and 26 are here conical surfaces.

By way of example, the stops 23 and 24 make with respect to X1–X2 axis an angle on the order of 75° and the bearings 25 and 26 make with respect to the X1–X2 axis an angle on the order of 20°.

The annular calibrated space 20 is filled with adhesive, this adhesive ensuring rigid mechanical connection between the male portion 13 and the female portion 7 therefore between the male component and the female component. This mechanical connection offers resistant torque which represents a fraction of the screw torque of the joint.

During the operation of screwing joint 1, FIGS. 5 to 8 show one means of introduction of the adhesive into the annular calibrated space 20.

In accordance with this mode, one will deposit by brush or by any means a film of adhesive, for example, shown here deliberately in a exaggeratedly enlarged way on the external surface 15 of male portion 13. A film of grease 28 is at the same time deposited on the female threading 6 as well as on the shoulder stop 24 and the bearing 26 in order to make screwing easier in the known manner. The female component 2 in which the female portion 7 is not coated with adhesive is then inserted on the male component 3 and it advances during screwing in helical fashion, by relative movement between the male and female components, in the axial direction indicated by the arrow F of FIG. 7.

In this manner, and because of the fact that the female portion is never during screwing in contact with the male portion as already explained, during screwing shown in FIG. 7, the downstream end 16 of the female component 2 and the internal surface 14 of the female portion 7 calibrate the film of adhesive 27, the excess adhesive 29 being pushed toward the front of end 16.

Simultaneously some grease 30 which is expelled under pressure by the threadings will come to be housed in the grease pocket 21 and partially fill it, as represented by crosshatching.

In FIG. 8, the joint is shown assembled, screwed at a predetermined torque as in FIG. 1; only the male and female portions are shown here.

One will find an excess of adhesive 29 downstream from the female component and a grease pocket 21 more or less filled with grease 30 under which a film of adhesive 31 will be found.

The annular calibrated space is filled with a film of adhesive of height h which is almost not disturbed by the grease. This adhesive is totally capable of carrying out its gluing function.

In the case of this example, we have selected, without this being in any way limiting, an epoxy resin-based adhesive with pre-mixed components that harden by heating in tens of seconds, designated commercially by the name TOPFIX NA 84 made by Atofindley.

After having completed the screwing at predetermined torque, one heats in the known manner, using a surrounding induction coil at a few kHz, the zone of male and female components corresponding to the annular calibrated space where the adhesive is located.

The duration of heating will depend on the diameter and the thickness of the pipes that are being used. For example, for pipes with an external diameter of 4½" and a thickness of 6.88 mm, the heating is carried out for about 30 seconds at 75 kW.

Tests will allow one to regulate the duration and power that are employed in this operation in order to obtain reliable gluing results.

Thus, after heating, the adhesive will ensure the desired mechanical connection.

It might happen that in certain cases, at the contact pressures used at the level of the bearing surfaces 17 and 18, a very thin film of adhesive will remain between these bearing surfaces. This will in no way harm effectiveness of the joint. In all cases these bearing surfaces 17 and 18 will protect the glued zone 20 from the fluid circulating outside the pipes.

For very severe applications, for example in sea water, one can additionally coat in the known manner pipes 4 and 5 and the external surface of the female component 2 with an epoxy type protective coating plus polypropylene or any other type.

Figure 3:
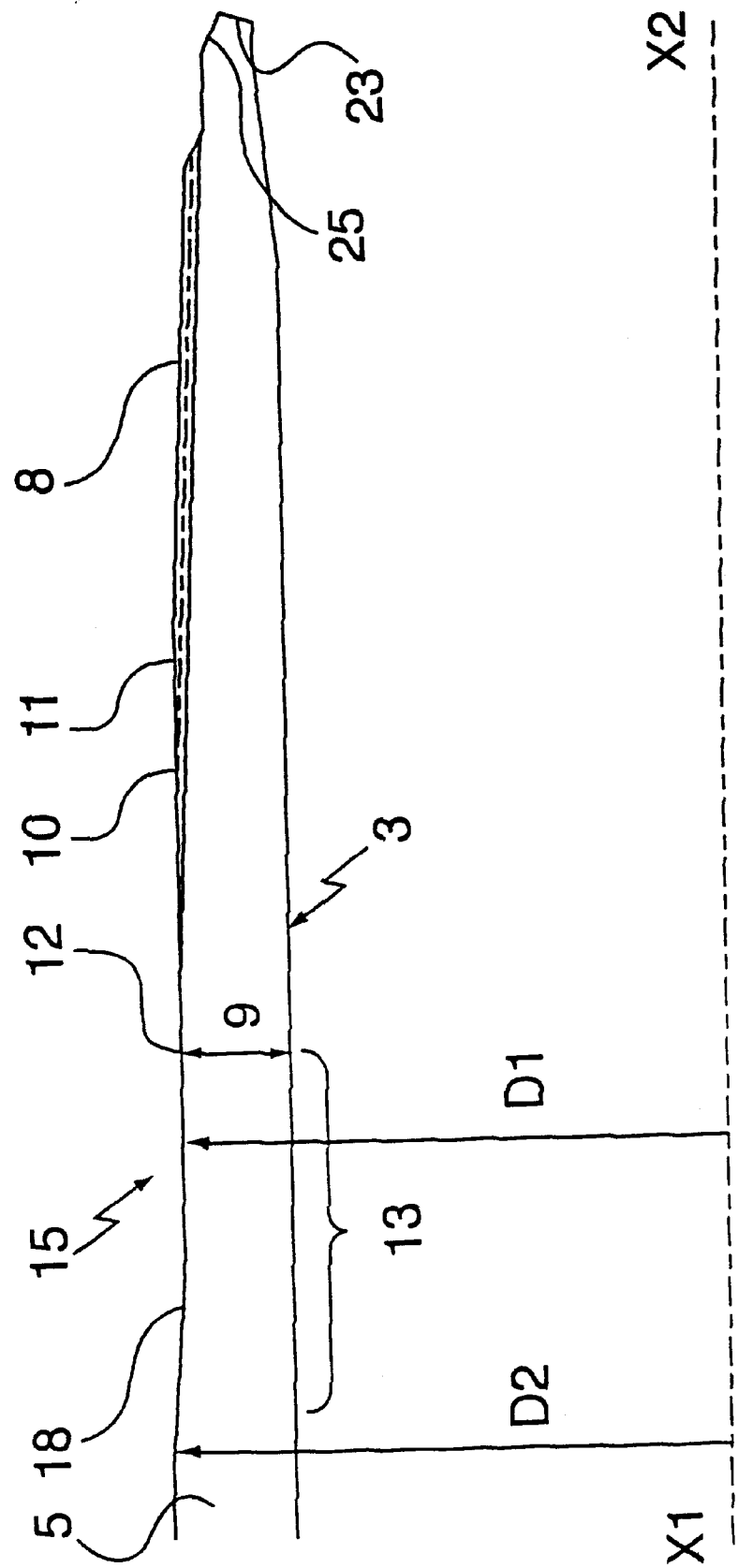
FIG. 3 is a sectional view of the male component, along the axis of the joint, in accordance with FIG. 1, with only the part located above the axis being shown here.

By way of example, we have made a joint as described in FIGS. 1 to 3 and screwed it together as described in FIGS. 5 to 8 under the following conditions:

external nominal diameter of the pipes 4:4½"

value of h: 0.2 mm value of H: 1.4 mm length L: 30% of the length including the male or female components TOPFIX NA 84 adhesive used as explained above Screwing torque: 740 m•kg Resistant torque caused by gluing: 350 m•kg or 47% of the screwing torque.

Thus one will obtain a joint for which the torque of over-screwing or unscrewing is increased approximately 50% with respect to a joint that is not supplied with a device opposed to over-screwing or unscrewing.

In addition, one will note that the production by machining of the female threading 6 of joint 1 is facilitated by the grease pocket 21 which comprises a beneficial insertion space for the machine tool.

Figure 4:
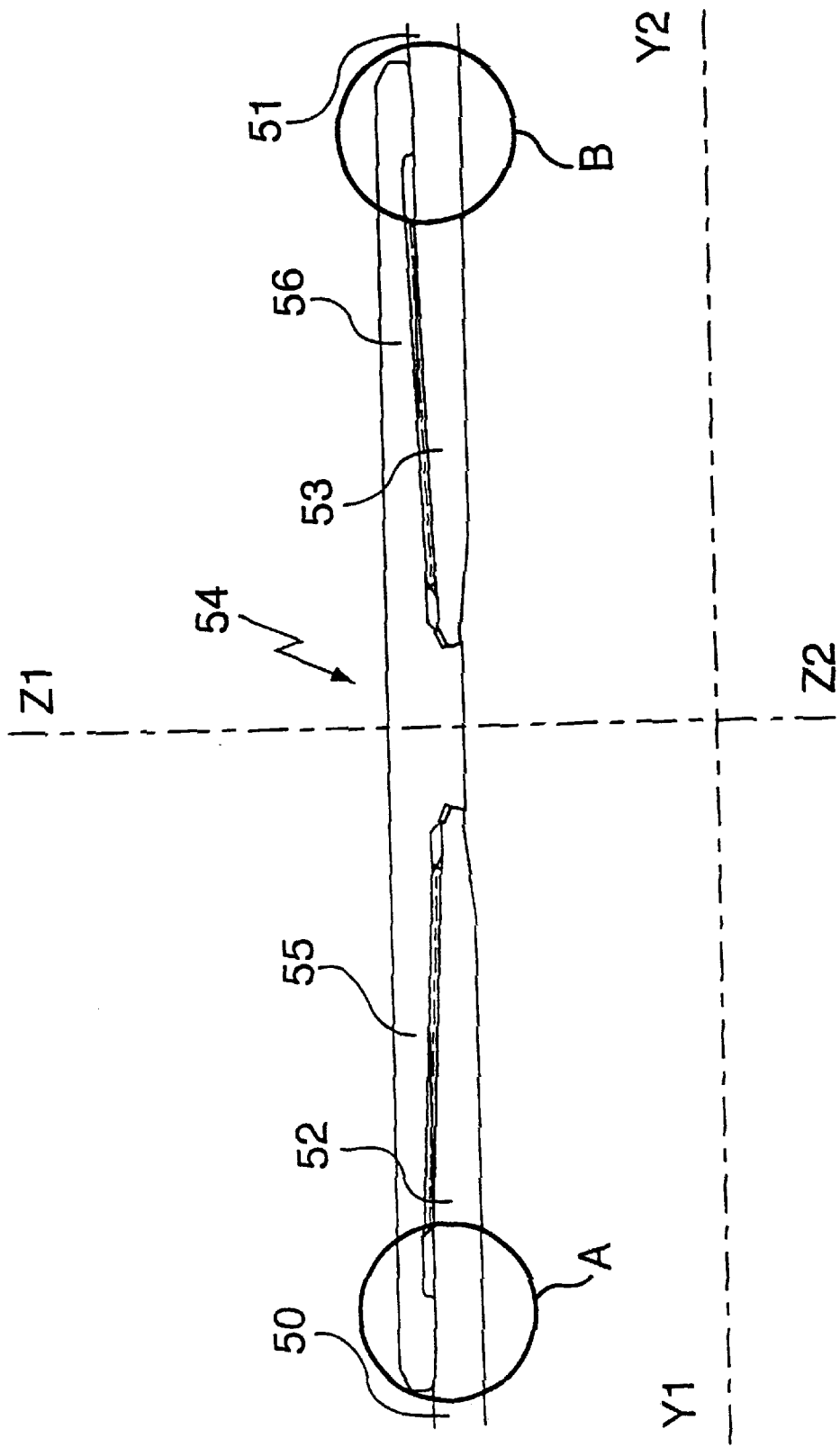
FIG. 4 is a sectional view of a sleeve coupling variant of the joint of FIG. 1, along the axis of the joint, with only the part located above the axis being shown here.

FIG. 4 gives a sleeve coupling variant of the joint of FIG. 1.

Two pipes 50 and 51 with common axis Y1–Y2 with each having at their end a male component 52, 53 are joined by a sleeve 54 that includes, arranged symmetrically with respect to the plane of the line Z1–Z2 and on each side of this plane Z1–Z3 a female component 55, 56.

Each pair of male-female components 52–55, 53–56 has been made as described previously and illustrated by FIGS. 1 to 3.

Such a joint made by means of sleeve 54 has two devices opposed to over-screwing or unscrewing in the zones marked A and B in FIG. 4, zones which are made as was explained for the joint of FIG. 1.

Figure 9:
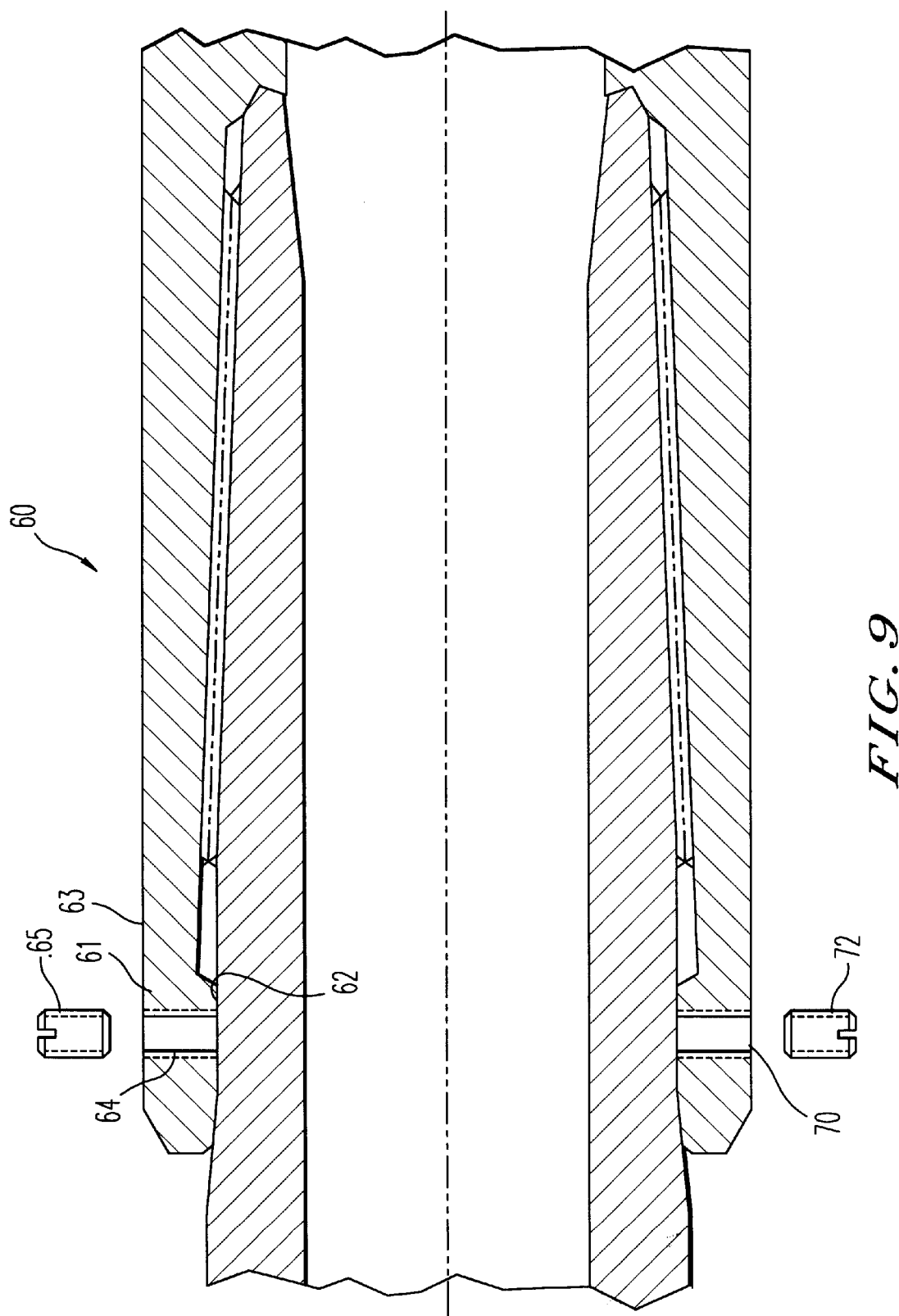
FIG. 9 is a sectional view of a variant of the joint of FIG. 1.
Figure 10:
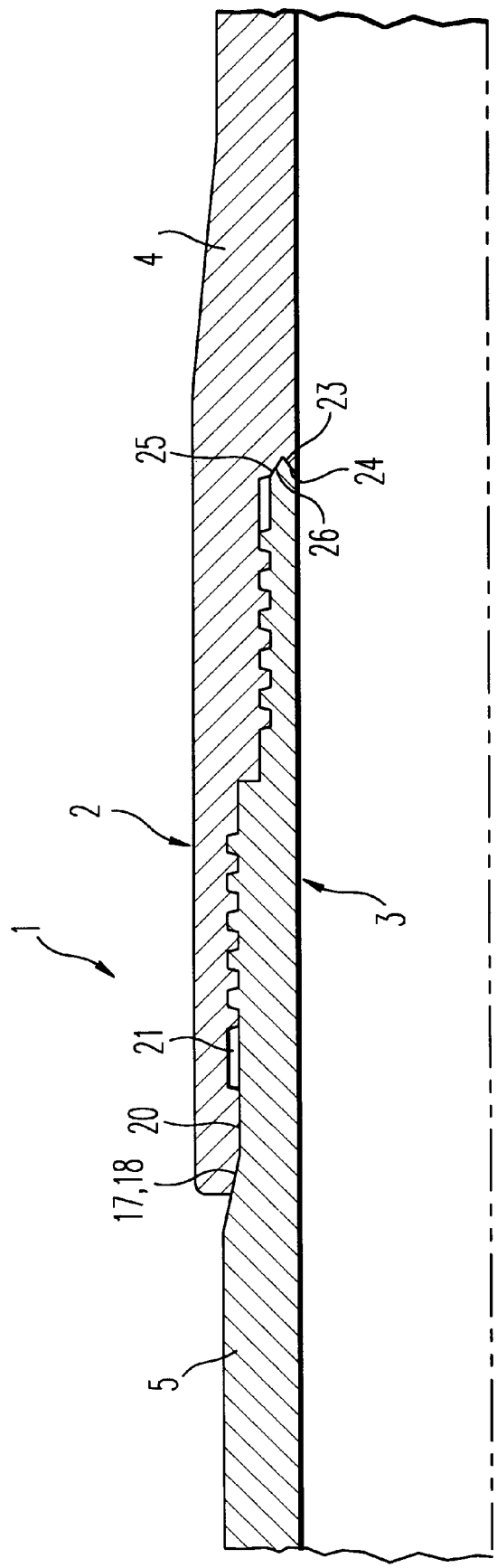
FIG. 10 is a sectional view of a joint according to the present invention having two stage threadings.
Figure 9:
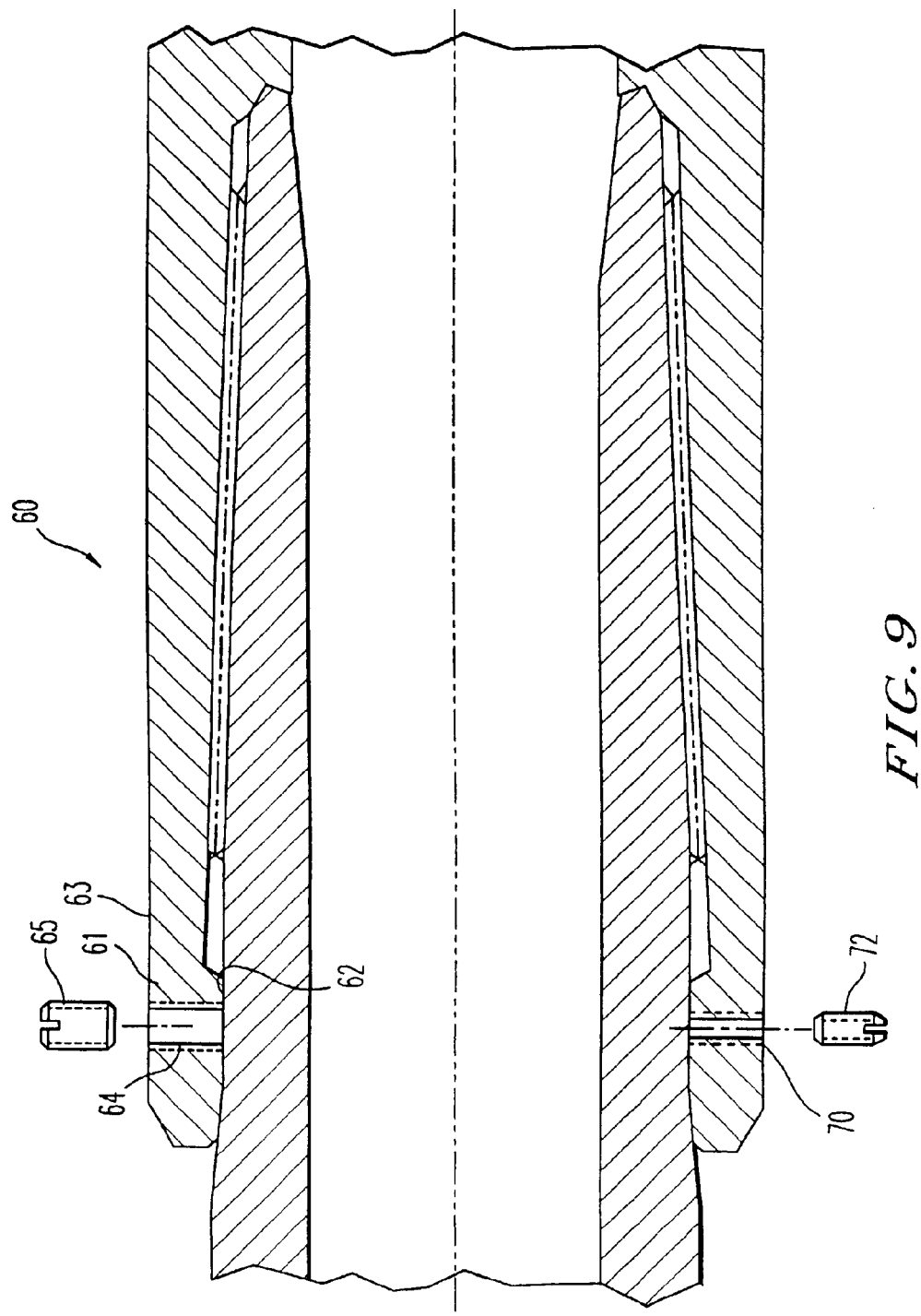

FIG. 9 represents a variant of the joint of FIG. 1 in which the adhesive in place of being deposited before screwing as shown in FIG. 5 is introduced once the joint has been screwed in at predetermined torque.

This joint 60 includes except for the female portion 61 the same characteristics as joint 1. The female portion 61 includes here in addition a threaded hole 64 that traverses the entire wall and opens on one side into the annular calibrated space 62 and on the other side on the external surface 63 of its female portion. The female portion 61 includes in addition diametrically opposed to hole 64 but of smaller diameter a second threaded hole 70 which is used as a vent channel.

This threaded hole 64 allows one to inject the desired pressure into the calibrated annular space 62 the adhesive in the necessary desired quantity to fill this zone, the vent hole 70 allowing one to inject the adhesive under good conditions.

Following injection, one will close the hole 64 by screwing in the threaded plug 65 which is shaped in such a way that it will neither exceed in the annular space 62 nor on surface 63, the adhesive being applied to the threaded section of plug 65. In the same manner one will close the second hole 70 with a glued threaded plug which is used to ensure a tight junction in operation.

Next, one will proceed as for joint 1 to heating of the adhesive in order to complete installation of the device opposed to over-screwing or unscrewing of the joint.

Of course, the joint in accordance with the invention can be taken apart. To achieve this, advantageously one will proceed before unscrewing to destruction of the adhesive by heating, heating it for example by induction in the known manner at a sufficiently high temperature. In this manner, one will not have to exert an unscrewing torque to overcome the resistance caused by the gluing of the two components. It will then be very easy to unscrew and clean the glue-covered surfaces in order to re-use the joint if one so desires, these glued surfaces not at all being deteriorated or damaged mechanically. In particular there will be no need to re-machine the surfaces of the calibrated space 20 before repeated use.

The joint according to the present invention can be made in many variants, the few examples of implementation shown here being in no way limiting.

What is claimed as new and desired to be secured by letters patent of the United States:

1. Tubular threaded joint of the type which includes a male component provided with an external male threaded section, a female component provided with a female internal threaded section corresponding to the threading of the male component and means which allow one to assemble these two components at a predetermined amount of torque, the male component being screwed inside the female component at a predetermined torque characterized in that the female component will include downstream from its threading a female portion which is provided at its end on its internal wall with a female bearing surface, the male component including upstream from its threading a male portion corresponding to the female portion, this male portion being provided at its end on its external wall with a male bearing surface, the male bearing surface and the female bearing surface being in supporting contact on one another, the internal surface of the female portion included between the end of the female threading and the female bearing surface and the external surface of the male portion included between the end of the male threading and the male bearing surface which have geometries so that they constitute an annular zone, at least one part of the measured length of this zone along the axis of the joint of this zone forming a calibrated annular space in which an adhesive which fills at least a portion of the annular calibrated space, ensures mechanical connection between the female portion and the male portion;

wherein said means which allow one to assemble the two components at a predetermined torque comprise at least one of A and B, wherein A is the threadings and wherein B is means independent of the threadings.

2. Joint according to claim 1 characterized in that the internal surface of the female portion and the external surface of the male portion which comprise the annular calibrated space are separated by a radial distance on the order of a few tenths of millimeters.

3. Joint according to claim 1, wherein the internal surface of the female portion and the external surface of the male portion which comprise the annular calibrated space are at least one of conical cylindrical surfaces, surfaces of rotation.

4. Joint according to claim 1, wherein the annular zone located between the end of the male and female threaded sections and the male and female bearing surfaces includes a grease pocket arranged directly in extension of the threadings.

5. Joint according to claim 4, wherein the annular calibrated space and the grease pocket are made in major part on the female portion.

6. Joint according to claim 1, wherein the male portion as well as the female portion and in particular the female bearing surface have a geometry such that the internal surface of the female portion and in particular the female bearing surface are not in contact with the external surface of the male portion during the screwing phase of the joint, a radial interval being maintained between these two surfaces, the female bearing surface coming into supporting contact on the male bearing surface at the end of screwing of the joint.

7. Joint according to claim 6, wherein the adhesive is deposited on the external surface of the male portion before screwing.

8. Joint according to claim 1, wherein the diameter of the external surface of the male portion between the male threading and the male bearing surface is less than the diameter of the common part of the pipe on which the male component is made.

9. Joint according to claim 1, wherein the male and female bearing surfaces are surfaces in the shape of a truncated cone.

10. Joint according to claim 1, wherein the adhesive used is an adhesive with controlled setting.

11. Joint according to claim 1, wherein the adhesive is an epoxy resin based adhesive.

12. Joint according to claim 1, wherein the adhesive is deposited on the external surface of the male portion before screwing.

13. Joint according to claim 12, wherein the adhesive is calibrated in an adhesive film by the displacement of the female portion with respect to the male portion during screwing of the joint.

14. Joint according to claim 1, wherein the adhesive is injected after screwing into the annular calibrated space by the intermediary of a hole which goes through the female portion at the level of the annular calibrated space, a hole which is preferably provided with means of closing.

15. Joint according to claim 14, further comprising a vent channel.

16. Joint according to claim 1, wherein said joint is of the integral type, the male component and the female component being made at the end of the pipes that are to be combined by the joint.

17. Joint according to claim 1, wherein said joint is of the sleeve coupling type, the female component being made at the end of one side of a sleeve, the male component being made on a pipe, an identical arrangement being made on the other side of the sleeve with another female component and another male component.

18. Joint according to claim 1, wherein the threadings are conical threadings.

19. Joint according to claim 1, wherein the threadings are cylindrical threadings.

20. Joint according to claim 1, wherein the threadings are threadings with two stages.

21. Joints according to claim 1, wherein the male component and the female component include a screw stop surface pair.

22. Joint according to claim 1, wherein the male component and the female component include a metal-to-metal tight bearing surface pair other than the bearing surfaces of the female portion and the male portion.

* * * * *

UNITED STATES PATENT AND TRADEMARK OFFICE
CERTIFICATE OF CORRECTION

PATENT NO. : 5,971,443
DATED : October 26, 1999
INVENTOR(S) : Thierrey Noel et al.

It is certified that error appears in the above-identified patent and that said Letters Patent is hereby corrected as shown below:

Drawings,
Replace Sheet 7 with the attached new Sheet 7 showing the hole 70 and its plug 72 "of smaller diameter" than the hole 64 and its plug 65.

Column 13,
Line 6, after "plug", insert -- 72 --.

Signed and Sealed this

Second Day of July, 2002

Attest:

Attesting Officer

JAMES E. ROGAN
Director of the United States Patent and Trademark Office